United States Patent
He et al.

(10) Patent No.: US 11,988,576 B2
(45) Date of Patent: May 21, 2024

(54) LEAK TEST DEVICE

(71) Applicant: CHANGXIN MEMORY TECHNOLOGIES, INC., Hefei (CN)

(72) Inventors: Jiaping He, Hefei (CN); Chin-Chung Ku, Hefei (CN)

(73) Assignee: Changxin Memory Technologies, Inc., Hefei (CN)

( * ) Notice: Subject to any disclaimer, the term of this patent is extended or adjusted under 35 U.S.C. 154(b) by 426 days.

(21) Appl. No.: 17/441,789

(22) PCT Filed: Jun. 30, 2021

(86) PCT No.: PCT/CN2021/103870
§ 371 (c)(1),
(2) Date: Sep. 22, 2021

(87) PCT Pub. No.: WO2022/088735
PCT Pub. Date: May 5, 2022

(65) Prior Publication Data
US 2023/0054970 A1   Feb. 23, 2023

(30) Foreign Application Priority Data
Oct. 29, 2020   (CN) .......................... 202011181217.9

(51) Int. Cl.
*G01M 3/26* (2006.01)
*G01M 3/32* (2006.01)
*B24B 7/22* (2006.01)

(52) U.S. Cl.
CPC ................ *G01M 3/26* (2013.01); *B24B 7/22* (2013.01); *G01M 3/3272* (2013.01)

(58) Field of Classification Search
CPC .......... G01M 3/26; G01M 3/3272; B24B 7/22
See application file for complete search history.

(56) References Cited

U.S. PATENT DOCUMENTS 5,643,056 A * 7/1997 Hirose .................... B24B 7/228
451/182
2004/0214513 A1   10/2004 Choi et al.

FOREIGN PATENT DOCUMENTS

CN    201895273 U    7/2011
CN    203376129 U    1/2014
(Continued)

OTHER PUBLICATIONS

International Search Report cited in PCT/CN2021/103870 mailed Oct. 12, 2021, 10 pages.
(Continued)

*Primary Examiner* — Peter J Macchiarolo
*Assistant Examiner* — John M Royston
(74) *Attorney, Agent, or Firm* — Cooper Legal Group, LLC

(57) ABSTRACT

The present disclosure provides a leak test device, including: a test platform, the test platform being configured to carry and place a polishing head to be tested for leak, the polishing head being divided into one or more independent partitions, each of the partitions having a chamber correspondingly, and each chamber having vents correspondingly; an upper cover for sealing the chambers, the upper cover being located on the side of the chambers away from the test platform; and a movable device, the movable device being movable on a surface parallel to the test platform, movable in a direction perpendicular to the test platform, and also adapted to apply pressure on the upper cover so that the upper cover seals the chambers.

17 Claims, 2 Drawing Sheets

(56) References Cited

FOREIGN PATENT DOCUMENTS

| CN | 103644290 | A | | 3/2014 |
|----|-----------|---|---|--------|
| CN | 104308736 | A | | 1/2015 |
| CN | 204556179 | U | | 8/2015 |
| CN | 105015923 | A | | 11/2015 |
| CN | 105115670 | A | | 12/2015 |
| CN | 204914342 | U | | 12/2015 |
| CN | 105547615 | A | | 5/2016 |
| CN | 106153273 | A | | 11/2016 |
| CN | 206527681 | U | | 9/2017 |
| CN | 107631845 | A | | 1/2018 |
| CN | 207095970 | U | | 3/2018 |
| CN | 108573887 | A | | 9/2018 |
| CN | 108818294 | A | | 11/2018 |
| CN | 208155543 | U | | 11/2018 |
| CN | 208239233 | U | | 12/2018 |
| CN | 109932133 | A | * | 6/2019 |
| CN | 109932133 | A | | 6/2019 |
| CN | 110553803 | A | | 12/2019 |
| CN | 110646153 | A | | 1/2020 |
| CN | 110653717 | A | | 1/2020 |
| CN | 111044233 | A | | 4/2020 |
| CN | 211386333 | U | | 9/2020 |
| JP | 2005080483 | A | | 3/2005 |
| KR | 20160037395 | A | | 4/2016 |

OTHER PUBLICATIONS

First Office Action cited in CN202011181217.9 mailed Aug. 19, 2022, 22 pages.
Second Office Action cited in CN202011181217.9 mailed Mar. 4, 2023, 32 pages.

* cited by examiner

LEAK TEST DEVICE

CROSS-REFERENCE TO RELATED APPLICATIONS

The present disclosure is a national stage entry of International Application No. PCT/CN2021/103870, filed on Jun. 30, 2021, which claims the priority to Chinese Patent Application 202011181217.9, titled "LEAK TEST DEVICE", filed to the CNIPA on Oct. 29, 2020. The entire contents of International Application No. PCT/CN2021/103870 and Chinese Patent Application 202011181217.9 are incorporated herein by reference.

TECHNICAL FIELD

The present disclosure relates to, but is not limited to, a leak test device.

BACKGROUND

The process principle of chemical mechanical polishing is to suck a wafer by a polishing head and match the friction of a polishing pad and the chemical reaction of polishing fluid to achieve complete flatness of the wafer. Whether the polishing head as a carrier platform during polishing sucks the wafer normally becomes the key to the success of the chemical mechanical polishing process. Therefore, the air tightness of the polishing head itself is required.

In the existing leak test device that checks the air tightness of the polishing head, the polishing head to be tested for leak is fixed in the leak test device through manual operation, then the pressure applied by an operator on the polishing head to be tested for leak is not easy to control, and non-uniform force application to the polishing head to be tested for leak easily occurs, resulting in damage of the polishing head to be tested for leak and misjudgment of the leak test device. In addition, the operator needs to fix the polishing head in the leak test device each time a leak is tested; each time the leak test is finished, the operator needs to take the polishing head out of the leak test device, which increases the time cost of the operator.

SUMMARY

The following is the summary of the subject matter described in detail in the present disclosure. The summary is not intended to limit the protection scope of the claims.

The present disclosure provides a leak test device, including: a test platform, the test platform being configured to carry and place a polishing head to be tested for leak, the polishing head being divided into one or more independent partitions, each of the partitions having a chamber correspondingly, and each chamber having vents correspondingly; an upper cover for sealing the chambers, the upper cover being located on a side of the chambers away from the test platform; and a movable device, the movable device being movable on a surface parallel to the test platform, movable in a direction perpendicular to the test platform, and also adapted to apply pressure on the upper cover so that the upper cover seals the chambers.

Other aspects will be apparent upon reading and understanding the accompanying drawings and detailed descriptions.

BRIEF DESCRIPTION OF THE DRAWINGS

The accompanying drawings incorporated into the description and constituting a part of the description illustrate the embodiments of the present disclosure, and are used together with the description to explain the principles of the embodiments of the present disclosure. In these drawings, similar reference numerals are used to indicate similar elements. The drawings in the following description are some embodiments of the present disclosure, but not all embodiments. For those skilled in the art, other drawings can be obtained from these drawings without any creative efforts.

DETAILED DESCRIPTION

A clear and complete description will be made to the technical solutions in the embodiments of the present disclosure below in combination with the drawings in the embodiments of the present disclosure. Apparently, the embodiments described are part of the embodiments of the present disclosure, not all of them. All other embodiments obtained by those skilled in the art based on the embodiments of the present disclosure without any creative efforts shall fall within the protection scope of the present disclosure. It should be noted that the embodiments in the present disclosure and the features in the embodiments can be combined with each other on a non-conflict basis.

It can be known from the background that, in the prior art, when a polishing head to be tested for leak is artificially fixed in a leak test device, non-uniform force application to the polishing head easily occurs, which leads to inaccurate leak test results; and an operator needs to fix the polishing head in the leak test device and take the polishing head out of the leak test device each time a leak is tested, which increases the time cost of the operator.

When an upper cover is fixed on a test platform by manually turning screws, the pressure applied on the upper cover is not easy to control, resulting in a large probability of non-uniform pressure applied on the upper cover; and the non-uniform pressure applied on the upper cover indirectly causes non-uniform pressure applied on the polishing head by the upper cover, which is likely to cause damage to the polishing head and lead to misjudgment of the leak test device. In addition, each time the polishing head is tested for leak and the upper cover is fixed, the pressure applied by screws on the upper cover each time cannot be accurately controlled to be consistent. Then, each time the leak is tested, the pressure applied on the upper cover and the pressure applied on the polishing head by the upper cover cannot be unified. Therefore, the accuracy of the leak test result of the polishing head tested by the leak test device cannot be guaranteed. Screw holes of the upper cover need to be manually aligned with screw holes of the test platform each time, and the upper cover needs to be fixed and detached each time, which increase the time cost of the operator.

Figure 1:
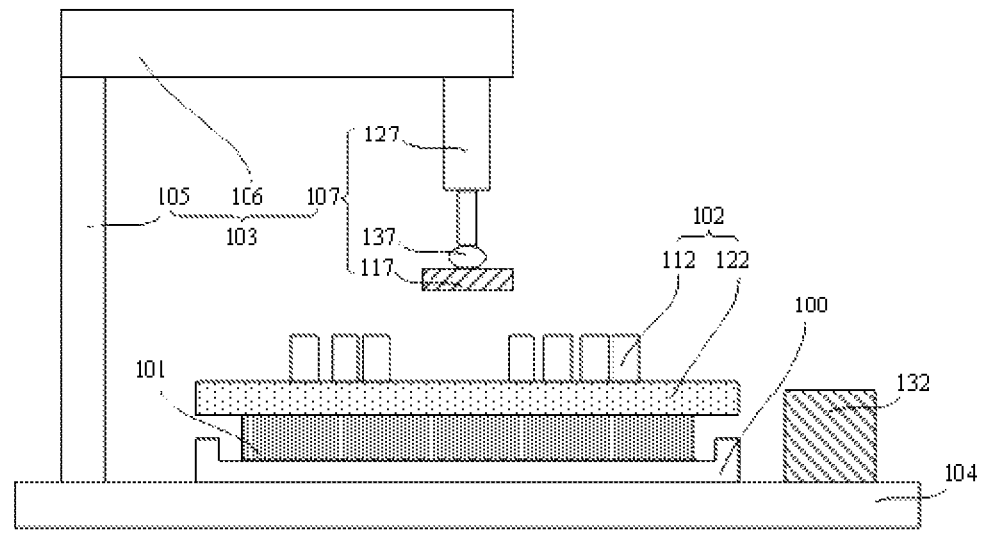
FIG. 1 is a partial front-view structure diagram of a leak test device provided by an embodiment of the present disclosure.
Figure 2:
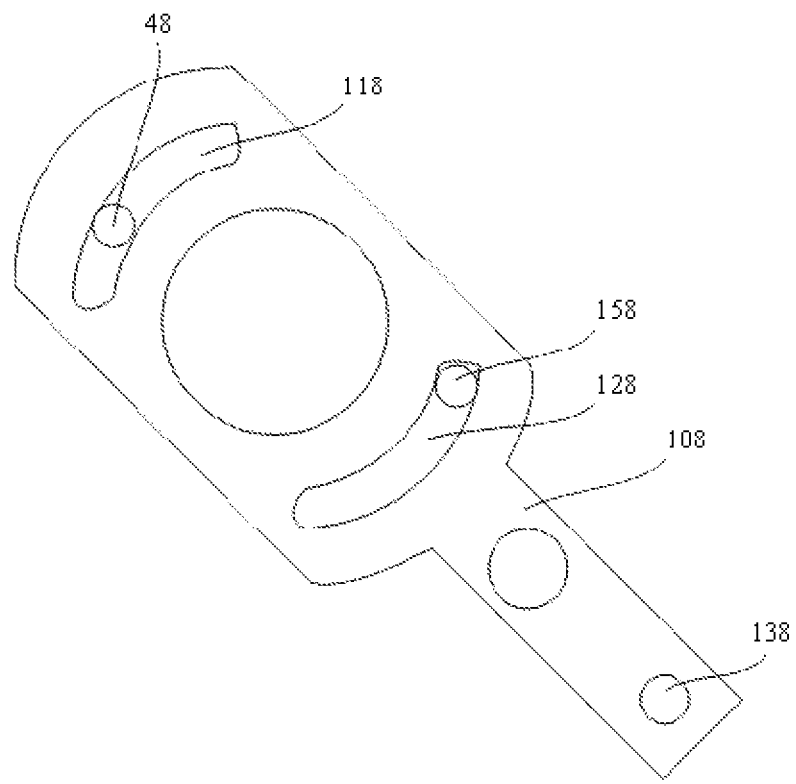
FIG. 2 is a top-view structure diagram of a positioning device in the leak test device provided by an embodiment of the present disclosure.
Figure 3:
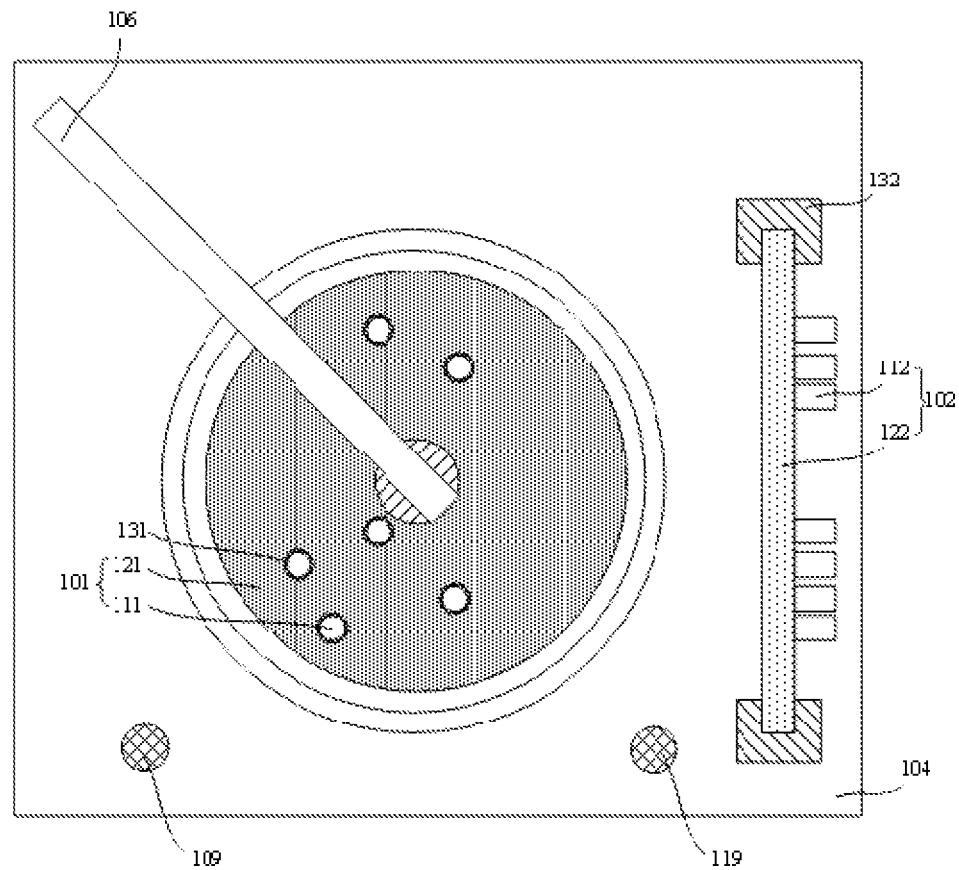
FIG. 3 is a partial top-view structure diagram of the leak test device provided by an embodiment of the present disclosure.
Figure 4:
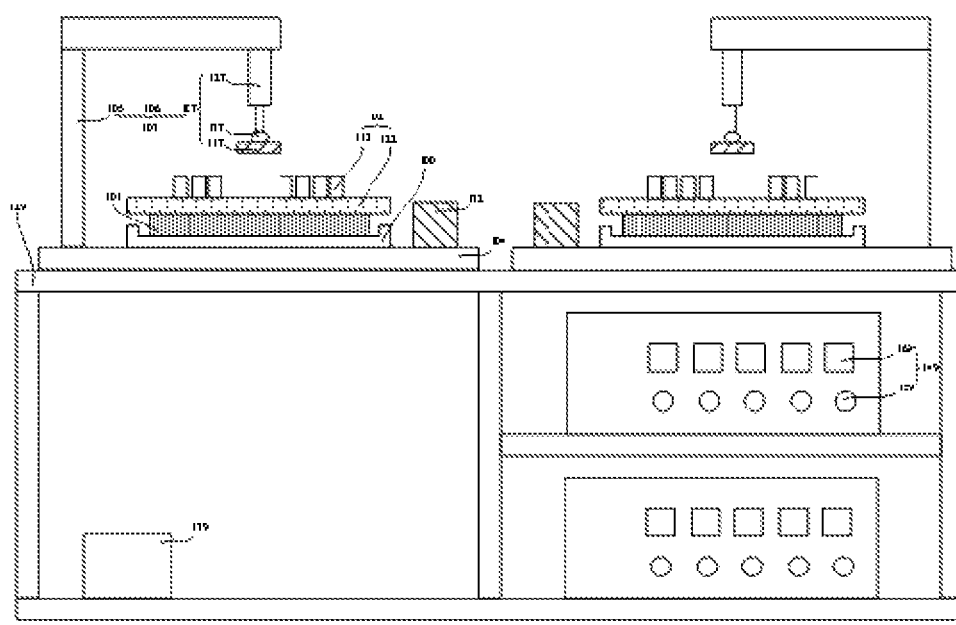
FIG. 4 is an overall front-view structure diagram of the leak test device provided by an embodiment of the present disclosure.

An embodiment of the present disclosure provides a leak test device, including: a movable device, the movable device being movable on a surface parallel to a test platform, movable in a direction perpendicular to the test platform, and also adapted to apply pressure on an upper cover. Applying pressure on the upper cover through the movable device enables the movable device to apply uniform force to the upper cover by adjusting the positional relationship between the movable device and the upper cover, so that the upper cover applies uniform force to a polishing head, which reduces the probability of damage to the polishing head and improves the accuracy of the leak test device; on the other hand, the pressure applied by the movable device on the upper cover for each leak test is easily controlled to be constant, then the standards of leak test are consistent, and the accuracy of leak test results is further improved. In addition, the operations of manually aligning screw holes of the upper cover with screw holes of the test platform and fixing and detaching the upper cover every time are not required, which reduces the time cost of an operator. FIG. 1 is a partial front-view structure diagram of a leak test device provided by an embodiment of the present disclosure; FIG. 2 is a top-view structure diagram of a positioning device in the leak test device provided by an embodiment of the present disclosure; FIG. 3 is a partial top-view structure diagram of the leak test device provided by an embodiment of the present disclosure; FIG. 4 is an overall front-view structure diagram of the leak test device provided by an embodiment of the present disclosure.

Referring to FIG. 1, in this embodiment, the leak test device includes: a test platform 100, wherein the test platform 100 is configured to carry and place a polishing head 101 to be tested for leak, the polishing head 101 may be divided into one or more independent partitions, each of the partitions has a chamber correspondingly, and each chamber has vents 111 correspondingly.

Referring to FIG. 3, the polishing head 101 includes a polishing head body 121 and vents 111, the polishing head 101 may be divided into 8 independent annular partitions, each annular partition has a chamber correspondingly, and each chamber has vents 111 correspondingly.

In other embodiments, the polishing head may be divided into any number of annular partitions, such as 2, 4, 6, or 7, the annular partitions correspond to the chambers one to one, and the polishing head may also be divided into a plurality of sector partitions or partitions in other shapes.

An upper cover 102 is configured to seal the chambers, and the upper cover 102 is located on the side of the chambers away from the test platform 100.

In this embodiment, the upper cover 102 includes an upper cover body 122 and air intake devices 112. The air intake devices 112 are disposed on the side of the upper cover 102 away from the polishing head 101, and the air intake devices 112 are communicated with the vents 111. When the upper cover 102 applies pressure on the polishing head 101, the upper cover 102 seals the chambers, meanwhile, the vents 111 corresponding to the chambers are communicated with the air intake devices 112, then the air intake devices 112 can provide air to the chambers corresponding to the vents 111, so as to test leak of the partitions corresponding to the chambers in the polishing head 101. In addition, a sealing ring 131 is disposed around the vent 111. The sealing ring 131 seals the connection between the vent 111 and the air intake device 112 of the upper cover 102. When the upper cover 102 applies uniform force to the polishing head 101, it can further ensure that the sealing ring 131 has good sealing effect at the connection between the vent 111 and the air intake device 112, which is beneficial to improving the accuracy of the leak test result of the leak test device.

An movable device 103 is movable on a surface parallel to the test platform 100 and movable in a direction perpendicular to the test platform 100, and is also adapted to apply pressure on the upper cover 102 so that the upper cover 102 seals the chambers.

The movable device 103 moves on the surface parallel to the test platform 100, so that the force point of the movable device 103 can be moved to the center of the upper cover 102, or the force points of the movable device 103 are uniformly distributed on the upper cover 102, so that the pressure applied by the movable device 103 on the upper cover 102 is uniformly distributed on the upper cover 102. In addition, the movable device 103 moves in the direction perpendicular to the test platform 100, so that the movable device 103 is in contact with the upper cover during leak test to apply pressure on the upper cover 102; and when the leak test is finished, the movable device 103 moves away from the upper cover 102 to facilitate the removal of the polishing head 101 under the upper cover 102.

In this embodiment, the leak test device further includes: a fixed platform 104 for carrying the test platform 100; and the movable device 103 includes: a fixed shaft 105, one end of the fixed shaft 105 being fixed on the fixed platform 104; a rotating shaft 106, one end of the rotating shaft 106 being connected to the other end of the fixed shaft 105, and being rotatable around the fixed shaft 105; and a pressing device 107, the pressing device 107 being connected to the other end of the rotating shaft 106, and after the rotating shaft 106 rotating to a preset position, the pressing device 107 being in contact with the upper cover 102 and applying pressure on the upper cover 102.

The preset position is a position of the rotating shaft 106 when the force point of the movable device 103 is located in the center of the upper cover 102 during the leak test, or a position of the rotating shaft 106 when the force points of the movable device 103 are uniformly distributed on the upper cover 102. The rotating shaft 106 rotates to the preset position, which enables the pressing device 107 to apply uniform force to the upper cover 102, so that the upper cover 102 applies uniform force to the polishing head 101.

In this embodiment, the leak test device further includes: a limiting component for fixing the position of the rotating shaft 106 after the rotating shaft 106 rotates to the preset position.

The rotating shaft 106 may rotate to the preset position through the limiting component and automatically stay at the preset position without manual positioning operation, which is beneficial to reducing the time cost of the operator.

The limiting component may be a positioning device, and the positioning device is disposed at the connection between the fixed shaft 105 and the rotating shaft 106.

Referring to FIG. 2, the positioning device includes a rotating body 108. The rotating body 108 has a first trench 118, a second trench 128, and two connecting holes 138. The two connecting holes 138 are configured to connect the rotating body 108 and the rotating shaft 106, so that the rotating shaft 106 rotates with the rotation of the rotating body 108. The positioning device further includes a first positioning pin 148 located in the first trench 118 and a second positioning pin 158 located in the second trench 128, both the first positioning pin 148 and the second positioning pin 158 are fixed on the fixed shaft 105, the rotating body 108 and the rotating shaft 106 rely on the sliding of the first trench 118 along the first positioning pin 148 and the sliding of the second trench 128 along the second positioning pin 158 to realize the rotation of the rotating shaft 106 around the fixed shaft 105, and with the central axis of the fixed shaft 105 as a center, the radians of the first trench 118 and the second trench 128 correspond to the radian of rotation of the rotating body.

Referring to FIGS. 2 and 3, when the rotating shaft 106 rotates to the preset position, the second positioning pin 158 is located at a tail of the second trench 128 of the rotating body 108, and the rotating body 108 and the rotating shaft 106 can no longer rotate clockwise around the fixed shaft 105, so that the rotating shaft 106 is fixed at the preset position.

In other embodiments, the rotating body is fixed on the fixed shaft by a positioning pin, the rotating body is fixed at the preset position, the side of the rotating body away from the fixed shaft has a raised part, and the raised part is configured to restrict the rotation of the rotating shaft. When the pressing device rotates to the preset position along with the rotating shaft, the pressing device can no longer rotate due to the restriction of the raised part, so the pressing device does not need to be manually positioned every time, which makes the leak test operation easier.

In this embodiment, the pressing device 107 includes at least one pressing head 117 and at least one pneumatic cylinder 127, the pressing head 117 is adapted to contact the upper cover 102, and the pneumatic cylinder 127 is configured to control the pressing head 117 to press and rise.

When a leak test is required, the pneumatic cylinder 127 controls the pressing head 117 to press, so that the pressing head 117 is movable in the direction perpendicular to the test platform 100 to contact the upper cover 102, and the pressing head 117 can apply pressure on the upper cover 102; when the leak test is finished, the pneumatic cylinder 127 controls the pressing head 117 to rise, the pressure applied by the pressing head 117 on the upper cover 102 is released, then the upper cover 102 is moved, the polishing head 101 under the upper cover 102 is taken out, and the polishing head 101 with qualified air tightness is placed in a polishing head box for later use.

The pressing head 117 applies pressure on the upper cover 102 by means of the pneumatic cylinder 127, so it is easy to control the pressure applied by the pressing head 117 on the upper cover 102, and it is easy to control the pressure applied by the pressing head 117 on the upper cover 102 to be constant during each leak test. Then the standards of leak test are consistent, which is beneficial to improving the accuracy of leak test results.

Continuing to refer to FIG. 1, the pressing device 107 includes a pressing head 117. After the rotating shaft 106 rotates to the preset position, the central axis of the pressing head 117 coincides with the central axis of the upper cover 102.

When a leak test is required, the central axis of the pressing head 117 coincides with the central axis of the upper cover 102, so that the force point of the pressing device 107 is located in the center of the upper cover 102, the pressure borne by the upper cover 102 is uniformly distributed on the upper cover 102, and the upper cover 102 applies uniform force to the polishing head 101, which reduces the probability of damage to the polishing head and improves the accuracy of the leak test device. In addition, where the pressing head 117 is in contact with the upper cover 102, the surfaces of the pressing head 117 and the upper cover 102 are relatively flat, so that the pressure applied by the pressing head 117 on the upper cover 102 is uniformly distributed on the upper cover 102.

In this embodiment, the pressing device 107 further includes a spherical universal joint 137, and the spherical universal joint 137 is disposed on the side of the pressing head 117 away from the upper cover 102.

When the test platform 100 and the fixed platform 104 are not placed parallel to each other, there is an angle between the plane of the upper cover 102 and the plane of the pressing head 117 when it is not in contact with the upper cover 102. The inclination angle of the pressing head 117 can be adjusted through the spherical universal joint 137 on the pressing head 117, so that during the subsequent leak test, the pressing head 117 is fully attached to the surface of the upper cover 102, to achieve the effect of uniform force application to the upper cover 102 by the pressing head 117.

In other embodiments, when the leak test is performed on the polishing head, non-uniform distribution of pressure applied by the upper cover on the polishing head is required to measure the air tightness of the polishing head under specific circumstances, which may be adjusted through the spherical universal joint on the pressing head, so that the pressing head is partially in contact with the upper cover during the leak test, then the pressure applied by the pressing head on the upper cover is not uniformly distributed on the upper cover, and the pressure applied by the upper cover on the polishing head is not uniformly distributed on the polishing head.

In other embodiments, the pressing device includes a plurality of pressing heads. After the rotating shaft rotates to the preset position, the pressing heads are uniformly arranged around the central axis of the upper cover at intervals.

When the leak test is required, the plurality of pressing heads are uniformly arranged around the central axis of the upper cover at intervals, so that the force points of the pressing device are uniformly distributed on the upper cover, the pressure borne by the upper cover is uniformly distributed on the upper cover, and the upper cover applies uniform force to the polishing head, which reduces the probability of damage to the polishing head and improves the accuracy of the leak test device.

Referring to FIGS. 1 and 3, the leak test device further includes: a control module, the control module being adapted to control the pneumatic cylinder 127; a first button 109 located on the fixed platform 104 and connected to the control module, the first button 109 being pressed such that the control module controls the pneumatic cylinder 127 to press; and a second button 119 located on the fixed platform 104 and connected to the control module, the second button 119 being pressed such that the control module controls the pneumatic cylinder 127 to rise.

The first button 109, the second button 119 and the control module control the movement of the pneumatic cylinder 127, so as to control the movement of the pressing head 117, which ensures that the pressure applied by the pressing head 117 on the upper cover 102 is constant during each leak test. Then the standards of leak test are consistent, thereby improving the accuracy of leak test results. In addition, the first button 109 is pressed to start the leak test and the second button 119 is pressed to end the leak test. Such operation is easy, and the time cost of the operator can be reduced.

In this embodiment, the leak test device further includes a pressure regulating valve disposed at an output end of the pneumatic cylinder 127, the pressure regulating valve being configured to control the pressure applied by the pressing head 117 on the upper cover 102.

The pressure applied by the pneumatic cylinder 127 on the pressing head 117 is adjusted by the pressure regulating valve, so as to adjust the pressure applied by the pressing head 117 on the upper cover 102, which enables the leak test device to adapted to different standards of leak test and to test the leak of the polishing head 101 for different leak test requirements.

In this embodiment, the range of pressure applied by the pressing head 117 on the upper cover 102 may be controlled by the pressure regulating valve to be 0.05 Mpa to 0.5 Mpa.

In this embodiment, the leak test device further includes: an accommodating device 132 located on the fixed platform 104 for placing the upper cover 102.

Referring to FIG. 4, the leak test device further includes a carrier platform 129 and an air source point 139, the carrier platform 129 includes at least one test platform 100 and at least one control device 149, the air source point 139 is connected to the control device 149, and the control device 149 is configured to provide air to the polishing head 101 and to display the leak test result of the polishing head 101. The air intake devices 112 are disposed on the side of the upper cover 102 away from the polishing head 101, the air intake devices 112 are communicated with the vents 111, and the air intake devices 112 are connected to the control device 149.

In this embodiment, a second adapter is disposed at an output end of the air source point 139, the second adapter shunts air provided by the air source point 139 into two pipes, and one pipe is connected to one control device 149. Therefore, one air source point 139 can provide air for two control devices 149 at the same time, and two polishing heads 101 on the carrier platform 129 can be tested for leak at the same time, which is beneficial to improving the leak test efficiency of the leak test device.

The control device 149 includes a plurality of air source output ends 159, and at least one air source output end 159 is connected to one air intake device 112 through a pipe.

Since one air source output end 159 is correspondingly connected to one air intake device 112, and one air intake device 112 is correspondingly communicated with one vent 111 in the polishing head 101, the one air source output end 159 can be configured to test the leak of one partition of the polishing head 101 corresponding to the vent 111.

In this embodiment, at least one air source output end 159 in the control device 149 may be provided with a first adapter, the first adapter shunts air provided by the air source output end 159 into at least two pipes, and one pipe is communicated with one air intake device 112.

Since one air source output end 159 is correspondingly connected with two air intake devices 112, and the two air intake devices 112 are correspondingly communicated with two vents 111 in the polishing head 101, the one air source output end 159 can be configured to test the leak of two partitions of the polishing head 101 corresponding to the two vents 111, and to test the air tightness of the two partitions of the polishing head 101 at the same time, which is beneficial to reducing the quantity of air source output ends 159 in the control device 149 and the quantity of devices for detecting and displaying the air tightness of the partitions, thereby saving the cost of manufacturing the leak test device.

In this embodiment, the control device 149 further includes a plurality of pressure sensors, the pressure sensors correspond to the air source output ends 159 one to one, the pressure sensors are configured to detect air pressure in the chambers of the partitions of the polishing head 101 connected to the air source output ends 159, and the air tightness of the partitions of the polishing head 101 is determined by the air pressure.

The control device 149 further includes a plurality of display devices 169, the display devices 169 correspond to the pressure sensors one to one, and the display devices 169 are configured to display the air pressure of the partitions of the polishing head 101 connected to the air source output ends 159.

In this embodiment, the leak test process for the polishing head 101 may be as follows: the chambers are charged with air by the air intake devices 112, the air charging is stopped when the air pressure in the chambers is 20 KPa, the state of sealing the chambers by the upper cover 102 is maintained, the leak test is kept for about one minute, and whether the air tightness of the polishing head 101 is qualified is determined by checking the corresponding air pressure of each chamber in the display device 169.

In this embodiment, pressure is applied on the upper cover 102 by the pressing head 117 in the pressing device 107. On the one hand, by adjusting the positional relationship between the pressing head 117 and the upper cover 102, the force point of the pressing head 117 is located in the center of the upper cover 102, or the force points of the pressing head 117 are uniformly distributed on the upper cover 102 during leak test, so that the pressing head 117 applies uniform force to the upper cover 102, and the upper cover 102 applies uniform force to the polishing head 101, which reduces the probability of damage to the polishing head 101 and improves the accuracy of the leak test device. On the other hand, it is easy to control the pressure applied by the pressing head 117 on the upper cover 102 during each leak test to be constant, then the standards of leak test are consistent, and the accuracy of leak test results is further improved. In addition, the operations of manually aligning screw holes of the upper cover 102 with screw holes of the test platform 100 and fixing and detaching the upper cover 102 every time are not required, which reduces the time cost of the operator.

The technical solution provided by the embodiments of the present disclosure has the following advantages:

The movable device applies pressure on the upper cover, which avoids the difficulty in controlling uniform distribution of the pressure on the upper cover when the upper cover is manually fixed on the test platform with screws; the movable device is movable on the surface parallel to the test platform and movable in the direction perpendicular to the test platform, which is beneficial to adjusting the positional relationship between the movable device and the upper cover and controlling the movable device to apply uniform force to the upper cover, and can control the pressure applied by the movable device on the upper cover to be constant during each test; and the standard of each leak test is the same, which is beneficial to improving the accuracy of leak test results. In addition, pressure is applied by the movable device on the upper cover, so the operations of manually aligning the screw holes of the upper cover with the screw holes of the test platform and fixing and detaching the upper cover every time are not required, and the time cost of the operator is reduced.

In addition, the movable device includes a limiting component for fixing the position of a rotating shaft of the movable device when the rotating shaft rotates to a preset position, without manually determining how many angles the rotating shaft needs to rotate when it rotates to the preset position. Therefore, the time cost of the operator can be reduced.

Moreover, a pressing device in the movable device relies on a pneumatic cylinder to push a pressing head to apply pressure on the upper cover. Compared with artificially applying pressure on the upper cover through screws, it is easier to control the pressure applied by the movable device on the upper cover through the pneumatic cylinder, and it is easier to ensure that the pressure applied on the upper cover is constant every time the leak is tested.

The embodiments or implementations in this specification are described in a progressive manner, each embodiment focuses on the differences from other embodiments, and the same or similar parts between the various embodiments may be referred to each other.

In the description of this specification, the descriptions with reference to the terms "embodiment", "exemplary embodiment", "some implementations", "schematic implementation", "example", etc. mean that specific features, structures, materials or characteristics described in conjunction with the embodiments or examples are included in at least one embodiment or example of the present application.

In this specification, the schematic descriptions of the above terms do not necessarily refer to the same embodiment or example. Moreover, the described specific features, structures, materials or characteristics can be combined in an appropriate manner in any one or more embodiments or examples.

In the description of the present disclosure, it should be noted that the orientations or positional relationships indicated by the terms "center", "upper", "lower", "left", "right", "vertical", "horizontal", "inner", "outer", etc. are based on the orientations or positional relationships shown in the accompanying drawings, and are intended to facilitate the description of the present disclosure and simplify the description only, rather than indicating or implying that the device or element referred to must have a particular orientation or be constructed and operated in a particular orientation, and will not to be interpreted as limiting the present disclosure.

It can be understood that the terms "first", "second", etc. used in the present disclosure can be used in the present disclosure to describe various structures, but these structures are not limited by these terms. These terms are only used to distinguish the first structure from another structure.

In one or more drawings, the same elements are represented by similar reference numerals. For the sake of clarity, various parts in the drawings are not drawn to scale. In addition, some well-known parts may not be shown. For the sake of brevity, the structure obtained after several steps can be described in one figure. Many specific details of the present disclosure are described below, such as the structure, material, dimension, treatment process and technology of devices, in order to understand the present disclosure more clearly. However, as those skilled in the art can understand, the present disclosure may not be implemented according to these specific details.

Finally, it should be noted that the above embodiments are merely used to describe, but not to limit, the technical solutions of the present disclosure. Although the present disclosure is described in detail with reference to the above embodiments, those of ordinary skill in the art should understand that various modifications may be made to the technical solutions described in the foregoing embodiments, or equivalent substitutions may be made to some or all technical features thereof, and these modifications or substitutions do not make the essences of the corresponding technical solutions depart from the scope of the technical solutions of the embodiments of the present disclosure.

INDUSTRIAL APPLICABILITY

According to the leak test device provided by the embodiment of the present disclosure, the movable device applies pressure on the upper cover, which avoids the difficulty in controlling uniform distribution of the pressure on the upper cover when the upper cover is manually fixed on the test platform with screws; the movable device is movable on the surface parallel to the test platform and movable in the direction perpendicular to the test platform, which is beneficial to adjusting the positional relationship between the movable device and the upper cover and controlling the movable device to apply uniform force to the upper cover, and can control the pressure applied by the movable device on the upper cover to be constant during each test; and the standard of each leak test is the same, which is beneficial to improving the accuracy of leak test results. In addition, pressure is applied by the movable device on the upper cover, so the operations of manually aligning the screw holes of the upper cover with the screw holes of the test platform and fixing and detaching the upper cover every time are not required, and the time cost of the operator is reduced. In addition, the movable device includes a limiting component for fixing the position of a rotating shaft of the movable device when the rotating shaft rotates to a preset position, without manually determining how many angles the rotating shaft needs to rotate when it rotates to the preset position. Therefore, the time cost of the operator can be reduced. Moreover, the pressing device in the movable device relies on a pneumatic cylinder to push a pressing head to apply pressure on the upper cover. Compared with artificially applying pressure on the upper cover through screws, it is easier to control the pressure applied by the movable device on the upper cover through the pneumatic cylinder, and it is easier to ensure that the pressure applied on the upper cover is constant every time the leak is tested.

The invention claimed is:

1. A leak test device, the leak test device comprising:
    a test platform, the test platform being configured to carry and place a polishing head to be tested for leak, the polishing head being divided into one or more independent partitions, each of the one or more independent partitions having a chamber correspondingly, and each chamber having vents correspondingly;
    an upper cover for sealing the chambers, the upper cover being located on a side of the chambers away from the test platform;
    a movable device, the movable device being movable on a surface parallel to the test platform, movable in a direction perpendicular to the test platform, and also adapted to apply pressure on the upper cover so that the upper cover seals the chambers; and
    a fixed platform for carrying the test platform,
    wherein the movable device comprises:
        a fixed shaft, a first end of the fixed shaft being fixed on the fixed platform;
        a rotating shaft, a first end of the rotating shaft being connected to a second end of the fixed shaft, and the rotating shaft being rotatable around the fixed shaft; and
        a pressing device, the pressing device being connected to a second end of the rotating shaft, and after the rotating shaft rotates to a preset position, the pressing device being in contact with the upper cover and applying the pressure on the upper cover.

2. The leak test device of claim 1, the leak test device further comprising a limiting component, wherein the limiting component is disposed at a connection between the fixed shaft and the rotating shaft, and the limiting component is configured to fix a position of the rotating shaft after the rotating shaft rotates to the preset position.

3. The leak test device of claim 1, wherein the pressing device comprises at least one pressing head and at least one pneumatic cylinder, the at least one pressing head is adapted to contact the upper cover, and the at least one pneumatic cylinder is configured to control the at least one pressing head to press and rise.

4. The leak test device of claim 3, wherein the at least one pressing head is one pressing head, and after the rotating shaft rotates to the preset position, a central axis of the one pressing head coincides with a central axis of the upper cover.

5. The leak test device of claim 3, wherein the at least one pressing head is a plurality of pressing heads, and after the rotating shaft rotates to the preset position, the plurality of pressing heads are uniformly arranged around a central axis of the upper cover at intervals.

6. The leak test device of claim 4, the leak test device further comprising:
- a control module, the control module being adapted to control the at least one pneumatic cylinder;
- a first button, located on the fixed platform and connected to the control module, the first button being pressed such that the control module controls the at least one pneumatic cylinder to press; and
- a second button, located on the fixed platform and connected to the control module, the second button being pressed such that the control module controls the at least one pneumatic cylinder to rise.

7. The leak test device of claim 4, the leak test device further comprising a pressure regulating valve disposed at an output end of the at least one pneumatic cylinder, the pressure regulating valve being configured to control pressure applied by the one pressing head to the upper cover.

8. The leak test device of claim 4, the pressing device further comprising a spherical universal joint, the spherical universal joint being disposed on a side of the one pressing head away from the upper cover.

9. The leak test device of claim 1, the leak test device further comprising:
- a carrier platform and an air source point, wherein the carrier platform comprises at least one test platform and at least one control device, the air source point is connected to the at least one control device, and the at least one control device is configured to provide air to the polishing head and to display a leak test result of the polishing head; and
- air intake devices, wherein the air intake devices are disposed on a side of the upper cover away from the polishing head, the air intake devices are communicated with the vents, and the air intake devices are connected to the at least one control device.

10. The leak test device of claim 9, wherein the at least one control device comprises a plurality of air source output ends, and at least one of the plurality of air source output ends is connected to one of the air intake devices through a pipe.

11. The leak test device of claim 10, wherein the at least one of the plurality of air source output ends is provided with a first adapter, the first adapter shunts air provided by the at least one of the plurality of air source output ends into at least two pipes, and one pipe of the at least two pipes is communicated with the one of the air intake devices.

12. The leak test device of claim 10, wherein the at least one control device further comprises a plurality of pressure sensors, and the plurality of pressure sensors are arranged in a one-to-one correspondence with the plurality of air source output ends.

13. The leak test device of claim 12, wherein the control device further comprises a plurality of display devices, and the plurality of display devices are arranged in a one-to-one correspondence with the plurality of pressure sensors.

14. The leak test device of claim 5, the leak test device further comprising:
- a control module, the control module being adapted to control the at least one pneumatic cylinder;
- a first button, located on the fixed platform and connected to the control module, the first button being pressed such that the control module controls the at least one pneumatic cylinder to press; and
- a second button, located on the fixed platform and connected to the control module, the second button being pressed such that the control module controls the at least one pneumatic cylinder to rise.

15. The leak test device of claim 5, the leak test device further comprising a pressure regulating valve disposed at an output end of the at least one pneumatic cylinder, the pressure regulating valve being configured to control pressure applied by the plurality of pressing heads to the upper cover.

16. The leak test device of claim 5, the pressing device further comprising a spherical universal joint, the spherical universal joint being disposed on a side of each of the plurality of pressing heads away from the upper cover.

17. A leak test device, the leak test device comprising:
- a test platform, the test platform being configured to carry and place a polishing head to be tested for leak, the polishing head being divided into one or more independent partitions, each of the one or more independent partitions having a chamber correspondingly, and each chamber having vents correspondingly;
- an upper cover for sealing the chambers, the upper cover being located on a side of the chambers away from the test platform;
- a movable device, the movable device being movable on a surface parallel to the test platform, movable in a direction perpendicular to the test platform, and also adapted to apply pressure on the upper cover so that the upper cover seals the chambers;
- a carrier platform and an air source point, wherein the carrier platform comprises at least one test platform and at least one control device, the air source point is connected to the at least one control device, and the at least one control device is configured to provide air to the polishing head and to display a leak test result of the polishing head; and
- air intake devices, wherein the air intake devices are disposed on a side of the upper cover away from the polishing head, the air intake devices are communicated with the vents, and the air intake devices are connected to the at least one control device,
- wherein the at least one control device comprises a plurality of air source output ends, and at least one of the plurality of air source output ends is connected to one of the air intake devices through a pipe,
- wherein the at least one of the plurality of air source output ends is provided with a first adapter, the first adapter shunts air provided by the at least one of the plurality of air source output ends into at least two pipes, and one pipe of the at least two pipes is communicated with the one of the air intake devices.

* * * * *